United States Patent [19]

Brindle et al.

[11] 4,160,443
[45] Jul. 10, 1979

[54] INFLATABLE SOLAR HEAT COLLECTOR

[75] Inventors: Dannie K. Brindle, 12797 W. 7th Ave., Golden, Colo. 80401; Donald Y. Shanfelt, 12844 W. Iliff Ave., Lakewood, Colo. 80215

[73] Assignees: Donald Y. Shanfelt; Dannie K. Brindle; Dennis D. Kiser; David W. Armagast; Patrick J. Lynch, ; part interest to each

[21] Appl. No.: 817,992

[22] Filed: Jul. 21, 1977

[51] Int. Cl.² ............................ F24J 3/02; F24H 7/02
[52] U.S. Cl. ...................................... 126/270; 126/400
[58] Field of Search ...................... 126/270, 271, 400; 34/93; 52/2

[56] References Cited

U.S. PATENT DOCUMENTS

| 3,022,781 | 2/1962 | Andrassy | 126/271 |
| 3,908,631 | 9/1975 | Rom | 126/270 |
| 4,003,365 | 1/1977 | Wiegand | 126/271 |
| 4,006,856 | 2/1977 | Nilsson | 126/270 |

Primary Examiner—John J. Vrablik
Attorney, Agent, or Firm—Crandell & Polumbus

[57] ABSTRACT

An elongated inflatable tubular housing is provided including front and rear wall portions. The front wall portion is constructed of solar radiation transparent material and a panel of solar radiation absorbing material is mounted in the housing and extends between opposite sides thereof dividing the interior of the housing into front and rear compartments between the panel and the front and rear walls, respectively. Air inlet structure is operative to introduce air to be heated into the front compartment at one end of the housing, air pass structure is provided and operative to pass air from the front compartment into the rear compartment at the other end of the housing and air outlet structure is provided and operative to exhaust heated air from the rear compartment. The air inlet structure and air outlet structure include structures for conveying air from the interior of an enclosure to be heated into the front chamber and from the rear chamber back into the enclosure to be heated.

20 Claims, 5 Drawing Figures

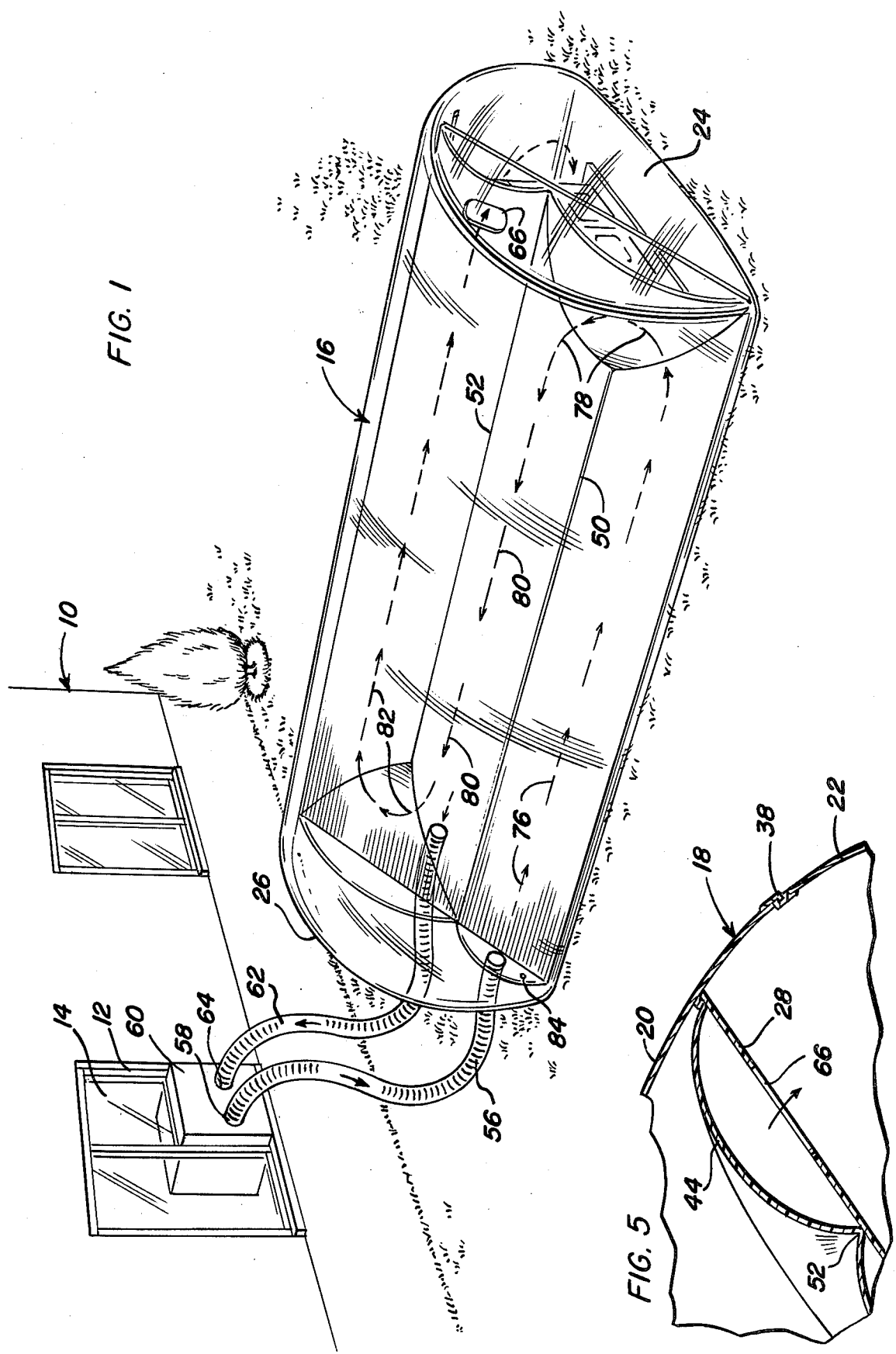

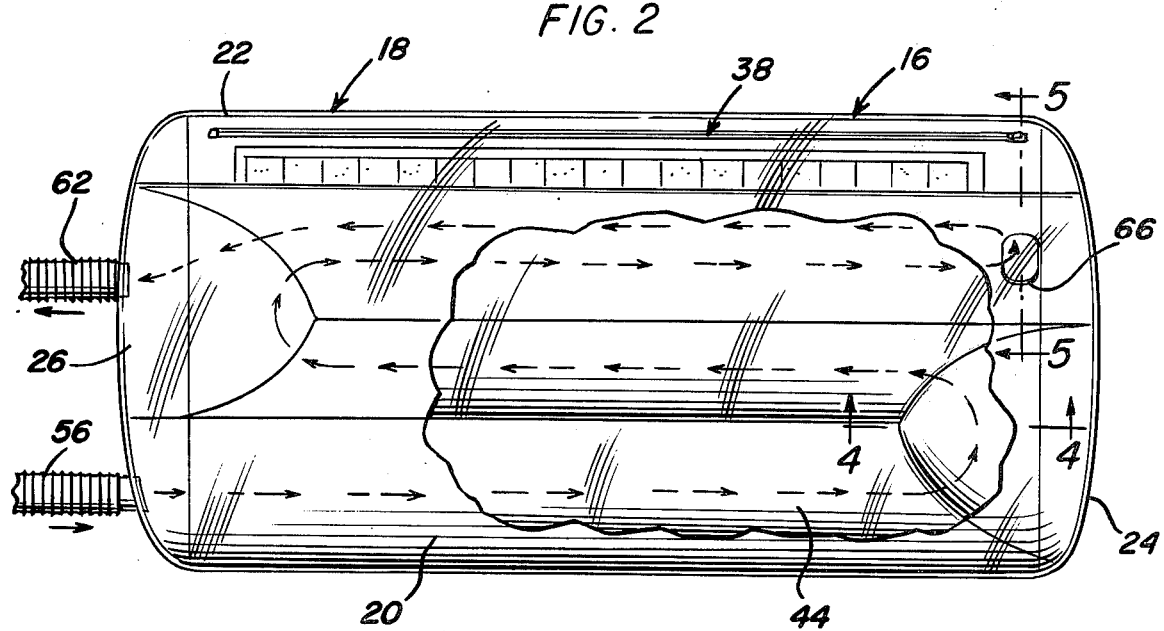
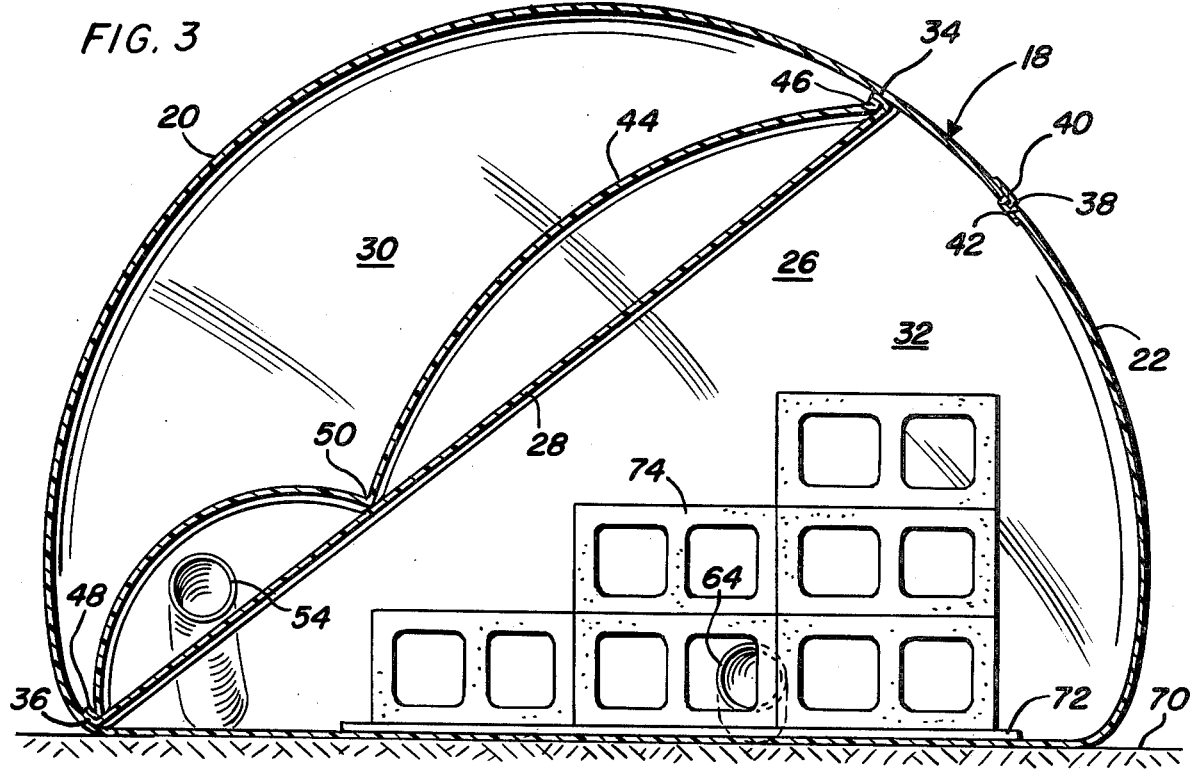
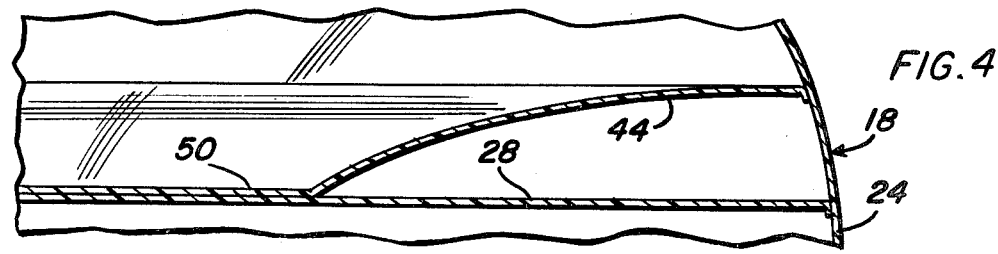

INFLATABLE SOLAR HEAT COLLECTOR

BACKGROUND OF THE INVENTION

Various forms of inflatable solar heat collectors have been heretofore provided.

Inflatable solar heat collectors include various desirable aspects including the ability to be readily collapsed and thus readily transportable and erectable at remote locations. In addition, inflatable solar heat collectors may be of light weight construction and are not as susceptible to damage as a result of being struck by a hard object or having hail impinge thereon.

While some inflatable solar heat collectors are operative to heat currents of air passing therethrough, most inflatable solar heat collectors do not include means operative to store quantities of collected heat. As a result, when the source of solar radiation is depleted, most inflatable solar heat collectors cease to perform the function of heating air pumped therethrough. Examples of various forms of flexible and inflatable solar heat collectors are disclosed in U.S. Pat. Nos. 3,125,091, 3,337,418, 3,453,666, 3,859,980 and 3,908,631.

The flexible and inflatable solar heat collector of the instant invention is constructed in a manner whereby it may be readily deflated and compactly stored for transport to a remote location. In addition, the solar heat collector of the instant invention includes structure whereby the air for inflation thereof is obtained from the flow of air pumped through the solar heat collector for heating. Also, the solar heat collector of the instant invention includes structure whereby a portion of the solar heat collected thereby during the hours of daylight may be stored and utilized to heat air pumped through the collector during the night time hours.

SUMMARY OF THE INVENTION

The main object of this invention is to provide an inflatable solar heat collector which will be efficient in collecting solar heat.

Another object of this invention is to provide a solar heat collector constructed in a manner whereby air to be heated on the interior of an adjacent building structure may be readily pumped into and through the solar heat collector and then from the solar heat collector back into the building.

Another important object of this invention is to provide a solar heat collector of the inflatable and collapsible type whereby it may be collapsed and stored in a compact state whenever desired.

Still another object of this invention is to provide a solar heat collector which will be operative to store a portion of the solar heat collected thereby during daylight hours and to thereafter give up the stored heat as a result of air being pumped through the solar heat collector during night time hours.

A final object of this invention to be specifically enumerated herein is to provide an inflatable solar heat collector in accordance with preceding objects and which will conform to conventional forms of manufacture, be of simple construction and easy to use so as to provide a device that would be economically feasible, longlasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of the solar heat collector of the instant invention in operative association with a building from which air to be heated is pumped into and through the solar heat collector and then back into the building;

FIG. 2 is a top plan view of the solar heat collector with portions of the upper cover film sheet thereof being broken away;

FIG. 3 is an enlarged transverse vertical sectional view of the solar heat collector;

FIG. 4 is an enlarged fragmentary longitudinal vertical sectional view taken substantially upon the plane indicated by the section line 4—4 of FIG. 2; and FIG. 5 is an enlarged fragmentary longitudinal vertical sectional view taken substantially upon the plane indicated by the section line 5—5 of FIG. 2.

DETAILED DESCRIPTION OF THE INVENTION

Referring now more specifically to the drawings the numeral 10 generally designates a building having a window opening 12 therein partially closed by means of a window assembly 14.

The solar heat collector of the instant invention is referred to in general by the reference numeral 16 and includes a generally tubular elongated housing referred to in general by the reference numeral 18. The housing 18 includes front and rear longitudinal walls 20 and 22 and the opposite ends of the housing 18 is closed by means of end walls 24 and 26.

The front wall 20, at least, is constructed of solar heat radiation transparent material and a panel 28 of solar radiation absorbent material is secured between remote longitudinal wall sections of the housing 18 and defines front and rear chambers 30 and 32 in the space between the panel 28 and front wall 20 and the panel 28 and rear wall 22, respectively. The housing 18 comprises a generally cylindrical housing constructed of solar radiation transparent film and the panel 28 comprises a panel of solar radiation absorbent film. The longitudinal edges of the panel 28 are secured to the adjacent wall portions of the housing 18 as at 34 and 36 and the opposite end marginal portions of the panel 28 are secured in a similar manner to the end walls 24 and 26. Further, the rear wall 22 includes a longitudinally extending and substantially full length access opening 38 therein removably closed by means of releasably engageable marginal portions 40 and 42 of the rear wall 22 on opposite sides of the access opening 38. Any suitable form of slide fastener may be operatively associated with the marginal portions 40 and 42 for movement therealong in order to open and close the access opening 38. The marginal portions 40 and 42 when releasably engaged with each other, close the access opening 38 in a substantially airtight manner.

In addition to the panel 28, a second panel 44 of solar radiation transparent film is secured between the same wall portions of the housing 18 to which the longitudinal edges of the panel 28 are secured as at 46 and 48 and the panel 44 has longitudinal zones 50 and 52 thereof sealed relative to corresponding longitudinal zones of the panel 28.

The end wall 26 includes an inlet opening 54 at one end of the housing 18 which opens into the interior of the chamber 30 between the panels 28 and 44 below the zone 50. The discharge end of an air conduit 56 is sealingly connected to the end wall 26 about the opening 54 and the inlet end of the air conduit 56 is connected to the outlet 58 of an air handling unit 60 mounted in that portion of the window opening 12 not occupied by the window assembly 14. A second air conduit has its inlet end communicated with the chamber 32 at the same end of the housing 18 through an opening 64 formed in the end wall 26 below the panel 28 and the discharge end of the second air conduit 62 is connected to the inlet opening 64 of the air handling unit, the latter having electrically powered air pump means (not shown) for pumping air from the interior of the building 10 through the air conduit 56 and into the interior of the solar heat collector 16 after which the air pumped into the solar heat collected is then ducted therefrom through the air conduit 16 and back into the interior of the building.

The panel 28 includes an opening 66 in the end portion of the housing 18 adjacent the end wall 24 and the opening 66 is formed in the panel 28 above the zone 52.

Further, the lower portion of the rear wall 22 is deflected into a flattened condition by and lies flat upon the ground 70 or support surface and has a panel base 72 supported from its upper surface. A plurality of tubular blocks 74 constructed of dense material are stacked upon the panel 72 and comprise a storage medium for a portion of the solar heat collected by the solar heat collector 16.

In operation, the air handler 60 is operative to pump air from the interior of the building 10 through the conduit 56 and into the housing 18 between the panels 28 and 44 below the zone 50. The air then passes the full length of the housing 18 in the manner indicated by the arrows 76 in FIG. 1. Thereafter, the air passes upwardly into the area between the panels 44 and 28 intermediate the zones 50 and 52 in the manner indicated by the arrows 78 after which the air again passes the full length of the housing 18 as indicated by the arrows 80 and then passes upwardly into the area between the panels 44 and 28 above the zone 52 as indicated by the arrows 82. Thereafter, the air again passes the full length of the housing 18 and passes through the opening 66 into the chamber 32 at the end of the housing adjacent the end wall 24. By making a triple pass longitudinally of the housing 18 in a tortuous passage defined between the panels 44 and 28 the air absorbs considerable heat which has been absorbed by the solar radiation absorbent panel 28. Then, the heated air is passed into the chamber 32, in and around the blocks 74 in order to heat the same, and thereafter outwardly of the housing 18 through the air conduit 62 and back into the interior of the building 10. The housing 18 is maintained in an inflated and self-supported condition by means of the pressure of the air being pumped therethrough and if for any reason access must be had to the interior of the housing 18, such access may be had through the access opening 38.

During the daylight hours the air being discharged from the air conduit 62 back into the interior of the building 10 will have been elevated considerably in temperature. In addition, the blocks 74 will have absorbed considerable quantitites of heat. Then, when the sun sets the air handler still functions to pump air through the solar heat collector 16 and the air pumped through the collector absorbs from the heat stored in the blocks 74. Thus, the solar heat collector is operative over an extended period of time as opposed to being limited to operation only during the hours between sunrise and sunset.

It will be noted that a small bleed opening such as the opening 84 in the panel 44 adjacent the end wall 26 may be required in order to main the front wall 20 of the housing 18 in an inflated condition spaced above the panel 44. However, it will be appreciated that the front wall 20 of the housing 18 need not be provided if suitable means are provided to maintain the panel 28 in a generally planar condition. Of course, the panel 28 is maintained in a generally planar condition inasmuch as the air pressure on opposite sides of the panel 28 is substantially the same.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A solar heat collector including an elongated tubular housing formed of flexible film material defining an inflatable and flexible enclosure, said tubular housing including front and rear wall portions, said front wall portion being constructed of solar radiation transparent material, a panel of solar radiation absorbing material mounted in said housing and extending between opposite sides thereof dividing the interior of said housing into front and rear compartments between said panel and said front and rear walls, respectively, air inlet means operative to introduce pressurized air to be heated into said front compartment and said housing, air pass means operative to pass air from said front compartment into said rear compartment, the pressurized air introduced being received within the enclosure to inflate the tubular housing to structurally maintain said collector in an operative condition, the rear wall portion of said tubular housing adapted to contact a support surface from which said collector is supported, said solar radiation absorbing panel extending in a generally planar condition between opposite sides of said inflated tubular housing in generally spaced apart relation with respect to the portion of the rear wall contacting a support surface, and air outlet means operative to exhaust heated air from said rear compartment, said front compartment and air pass means including means insuring airflow through said front compartment at least substantially over the entire area of said solar radiation absorbing panel, said rear compartment and air pass means including means insuring airflow through said rear compartment and out of said collector.

2. The combination of claim 1 wherein said air pass means includes an opening through said panel.

3. The combination of claim 1 wherein said air inlet means and air outlet means include means for conveying air from the interior of an enclosure to be heated into said front chamber and for conveying air from said rear chamber back into said enclosure to be heated, respectively.

4. The combination of claim 1 wherein the opposite ends of said housing are closed by means of end walls thereof, the opposite ends of said absorption panel being sealingly secured to said end walls.

5. The combination of claim 1 wherein said panel and said front wall include means operative to define a tortuous passage extending throughout at least substantially the entire length of said housing.

6. The combination of claim 5 wherein said means operative to define a tortuous passage includes a panel of solar radiation transparent material overlying said absorption panel in spaced relation thereto over the majority of the area of said absorption panel.

7. The combination of claim 6 wherein said front wall and said rear wall define opposite side wall positions of a generally cylindrical housing, said absorption panel extending generally a diametric plane of said housing and said front wall extending between opposite side marginal edges of said absorption panel, and said transparent panel being spaced, throughout a major portion of its plan area, intermediate said absorption panel and said front wall.

8. The combination of claim 1 further comprising a panel of solar radiation transparent material sealed in generally parallel elongated zones to corresponding zones of said absorption panel to define a tortuous passage in said front compartment between said front wall and said absorption panel through which air introduced into said front compartment must pass before passing into said rear compartment.

9. The combination of claim 8 wherein said zones extend longitudinally of said housing.

10. The combination of claim 9 wherein said zones equal at least two in number.

11. The combination of claim 10 wherein the front wall said tubular housing includes solar radiation transparent material.

12. The combination of claim 11 wherein said front wall and said rear wall define opposite side wall positions of a generally cylindrical housing, said absorption panel extending between opposite side marginal edges of said absorption panel and said absorption panel being spaced, throughout a major portion of its plan area, from the rear wall contacting the support surface.

13. An inflatable flexible solar energy collector adapted to be positioned on a supporting surface and to be inflated by a flow of pressurized gas therethrough, said collector being operative to collect solar energy in the form of heat and transfer a substantial portion of the heat to the gas flowing therethrough, comprising:

an energy collecting panel comprising solar radiation absorbing material;

a first panel comprising solar radiation transparent material, said first panel being operatively sealed to said energy collecting panel at predetermined zone locations to define at least one gas conducting conduit between said energy collecting panel and said first panel;

a second panel comprising flexible material operatively connected with said energy collecting panel on the opposite side thereof from said first panel, said second panel operatively contacting the support surface for said collector, said second panel and said energy collecting panel defining a rear chamber; and means for supplying said rear chamber with gas under pressure to inflate the rear chamber and to position said energy collecting panel in a general planar condition and at an inclined angle generally with respect to supporting surface contacted by said second panel.

14. A solar collector as defined in claim 13 wherein the gas conducting conduit contacts substantially all of the area said energy collecting panel.

15. A solar collector as defined in claim 13 further comprising:

inlet means connected in communication with the gas conducting conduit for supplying the gas conducting conduit with a flow of gas.

16. A solar collector as defined in claim 15 wherein said means for supplying said rear chamber with a supply of gas comprises:

passgeway means operatively extending from the gas conducting conduit into the rear chamber.

17. A solar collector as defined in claim 16 further comprising:

collector outlet means operative connected for conducting a flow of gas from said collector.

18. A solar collector as defined in claim 13 wherein said energy collecting and first panels comprise flexible material, and further comprising:

a thrid panel comprising flexible solar radiation transparent material, said third panel being operatively connected with said first panel on the opposite side of said first panel from said energy collecting panel, said first and third panels defining a front chamber; and means for supplying said front chamber with gas under pressure to inflate said front chamber, the inflated front chamber operatively applying pressure on said energy collecting panel to resist deformation from the generally planar condition due to pressure from the inflated rear chamber on said energy collecting panel.

19. A solar collector as defined in claim 18 wherein said means for supplying said front and rear chamber with a supply of gas comprises:

passageway means operatively extending from the gas conducting conduit into the front and rear chambers for supplying the front and rear chambers with a supply of gas under pressure.

20. A solar collector as defined in claim 18 wherein said second and third panels collectively comprise portions of a tubular housing within which said energy collecting panel and first panel are interiorly contained.

* * * * *